United States Patent Office 3,198,782
Patented Aug. 3, 1965

3,198,782
METALLISED AZO HALOPYRIMIDINE DYESTUFFS
Herbert Francis Andrew and Donald Buckley, both of Manchester, England, assignors to Imperial Chemical Industries Limited, Millbank, London, England, a corporation of Great Britain
No Drawing. Filed June 21, 1961, Ser. No. 118,537
Claims priority, application Great Britain, July 12, 1960, 24,259/60
4 Claims. (Cl. 260—146)

This invention relates to new metallised azo dyestuffs of the trihalogenopyrimidine series valuable as reactive dyestuffs for textile materials containing active hydrogen, for example natural and regenerated cellulose, and animal and polyamide textile fibres.

According to the invention there are provided as new dyestuffs the metal complexes of the azo dyestuffs of the formula

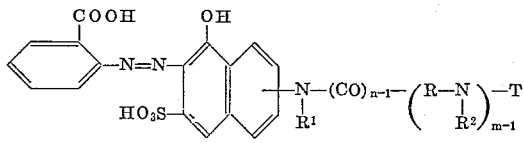

wherein R is a substituted or unsubstituted phenylene radical, $R^1$ and $R^2$ stand for hydrogen or lower alkyl radicals, T represents a trihalogenopyrimidyl radical and $m$ and $n$ each stand for 1 or 2, provided that when $m$ is 1, $n$ is not 2.

As examples of metal complexes of azo dyestuffs of the above formula there may be mentioned the nickel, cobalt and copper and especially the chromium complexes.

As examples of phenylene radicals which may be represented by R there may be mentioned 1:2-, 1:3- and 1:4-phenylene and as examples of substituents which may be carried by such radicals there may be mentioned halogeno such as chloro and bromo, alkyl such as methyl, alkoxy such as methoxy, and carboxylic acid and sulphonic acid groups.

As examples of lower alkyl radicals which may be represented by $R^1$ and $R^2$ there may be mentioned methyl, ethyl, propyl and butyl.

The exact configuration of the trihalogenopyrimidyl radical represented by T as produced by the process given below is not known with certainty. It is probable that this radical is a 4:5:6-trihalogenopyrimid-2-yl radical, but it is also possible that it is a 2:5:6-trihalogenopyrimid-4-yl radical. As examples of halogen atoms which may be present in the trihalogenopyrimidyl radical represented by T there may be mentioned chlorine and bromine.

According to a further feature of the invention there is provided a process for the manufacture of the new metallised azo dyestuffs as hereinbefore defined which comprises interacting an aminoazo compound which in the form of its free acid is of the formula

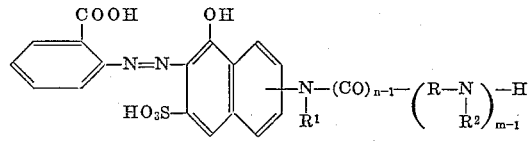

wherein R, $R^1$, $R^2$, $n$ and $m$ have the meanings previously stated, with a metallising agent and a substantially equimolecular proportion of a tetrahalogenopyrimidine.

In general it is preferred to use equimolecular proportions of the starting materials, but occasionally it may prove advantageous, in order to improve the yield or quality of the product, to use an excess, for example up to 20% excess, of the tetrahalogenopyrimidine over the weight which is theoretically equivalent to the weight of the other reactant present.

As examples of tetrahalogenopyrimidines there may be mentioned tetrachloropyrimidine, tetrabromopyrimidine and 2:4:6-trichloro-5-bromopyrimidine.

The aminoazo compound may be reacted with the tetrahalogenopyrimidine and the trihalogenopyrimidyl derivative so obtained subsequently treated with the metallising agent, but it is preferred to treat the aminodisazo compound with the metallising agent and subsequently to react the metal complex so obtained with the tetrahalogenopyrimidine.

The aminoazo compound or trihalogenopyrimidyl derivative thereof may be metallised by known methods, for example by heating with an aqueous solution of the metallising agent and the metal complex so formed may be isolated by adding sodium chloride and filtering off the precipitate.

As examples of metallising agents which may be used in this process of the invention there may be mentioned copper sulphate, copper acetate, nickel chloride, nickel sulphate, cobalt acetate, chromium formate and chromium acetate, but the preferred metallising agents are agents yielding chromium.

The condensation between the aminodisazo compound or metal complex thereof and the tetrahalogenopyrimidine may conveniently be carried out in an aqueous medium, for example water or a mixture of water and a water-soluble organic solvent such as acetone or dioxan at a temperature between 20° and 100° C. and preferably between 60 and 95° C. If desired an acid-binding agent for example sodium carbonate or sodium bicarbonate may be added. Unreacted halogenopyrimidine may then be removed if desired, for example by steam distillation and the product may then conveniently be salted out and filtered off.

It is generally preferable to isolate the new dyestuffs from the media in which they have been formed at a pH of from 6 to 8 and to dry the resultant dyestuff pastes, preferably in the presence of buffering agents suitable for maintaining a pH value of about 6.5. Examples of such buffering agents are mixtures of sodium dihydrogen phosphate and disodium hydrogen phosphate or of disodium hydrogen phosphate and potassium dihydrogen phosphate.

As specific examples of aminoazo compounds which may be used in the process of the invention there may be mentioned 2-(2'-carboxyphenylazo)-6-amino-1-naphthol-3-sulphonic acid, 2-(2'-carboxyphenylazo)-7-amino-1-naphthol-3-sulphonic acid, 2-(2'carboxyphenylazo)-7-(4″ - amino - 3″ - sulphophenylamino)-1-naphthol-3-sulphonic acid, 2 - (2'-carboxyphenylazo)-6-(4″-amino-3″-sulphophenylamino)-1-naphthol-3-sulphonic acid, 2-(2'-carboxyphenylazo) - 6 - (4″-aminophenylamino)-1-naphthol - 3 - sulphonic acid, 2-(2″-carboxyphenylazo)-7-(4″-aminophenylamino) - 1 - naphthol-3-sulphonic acid, 2-(2'-carboxyphenylazo) - 6-(4″-aminobenzoylamino)-1-naphthol - 3 - sulphonic acid, 2-(2'-carboxyphenylazo)-7-(4″-aminobenzoylamino) - 1-naphthol-3-sulphonic acid, 2-(2'-carboxyphenylazo) - 6 - methylamino - 1-naphthol-3-sulphonic acid, 2 - (2'-carboxyphenylazo)-7-methylamino-1-naphthol-3-sulphonic acid.

The new dyestuffs of the invention may be used to colour silk, wool, regenerated protein and cellulosic textile materials for example cotton, linen and viscose rayon, by treating the textile material with an aqueous solution (which may be a thickened printing paste) of the dyestuff in conjunction with a treatment with an acid-binding agent, for example sodium hydroxide, potassium phosphate, potassium carbonate, trisodium phosphate, sodium metasilicate or sodium carbonate. The treatment with the acid-binding agent may be carried out prior to, simultaneously with or after the treatment with the dystuff.

When the acid-binding agent is applied simultaneously with the dystuff, it may conveniently be dissolved in the dyestuff solution or the printing paste containing the dyestuff.

The dyestuff solution whether acid-binding agent is present or not, may contain commonly used dyebath adjuvants for example sodium chloride, sodium sulphate, sodium alignate, urea and water-soluble alkyl ethers of cellulose.

The printing paste, whether acid-binding agent is present or not, may contain commonly used adjuvants for example urea and sodium m-nitrobenzenesulphonate and thickening agents for example methyl cellulose, starch and locust bean gum, but an alginate, for example sodium alginate is preferred as thickening agent.

Dyeing in the presence of acid-binding agent is preferably carried out at elevated temperatures, for example at temperatures between 70° C. and the boiling point of the dystuff solution in order to improve the exhaustion and fixation of the dyestuff. Thus for example the textile material can be immersed in a dyebath comprising an aqueous solution of the dyestuff, the dyebath heated at a temperature between 70° C. and the boiling point of the dyestuff solution, the acid-binding agent added, and dyeing continued for a further period at a temperature between 700 C. and the boiling point of the dyestuff solution.

The textile material printed with printing paste containing acid-binding agent is preferably steamed preferably at a temperature between 100° and 110° C. or heated preferably at a temperature between 120° and 150° C. in order to fix the dyestuff on the textile material.

When the acid-binding agent is applied in a separate step before or after the dyestuff, it is preferably applied by treating the textile material with an aqueous solution of the acid-binding agent, for example by a padding technique. The aqueous solutions of acid-binding agents thus used may also contain dybath adjuvants of the kind mentioned above.

Both the solution of acid-binding agent and the dyestuff solution containing the dyestuff may be applied at room temperature or at an elevated temperature for example at temperatures between 50° C. and the boiling point of the solution of the acid-binding agent or the solution of the dyestuff, the textile material being optionally dried between the two treatments, but when dyeing protein or regenerated protein fibres in conjunction with an acid-binding agent it is preferred to use a temperature below 50° C. for example a temperature between 20° and 50° C. It is preferred to heat or steam cellulosic textile materials at an elevated temperature, for example at 100° C. or at a higher temperature for example at a temperature between 100° and 150° C. for a short period of time after application of dyestuff and acid-binding agent to fix the dyestuff on the textile material.

The above processes may be modified by using, in place of the acid-binding agent, a substance which on heating or steaming generates an acid-binding agent, and thereafter subjecting the textile material to heat or steam after the treatment with the dyestuff and the said substance, in order to generate the acid-binding agent.

As an example of a substance which on heating or steaming generates an acid-binding agent, there may be mentioned an alkali metal bicarbonate, for example sodium bicarbonate which on heating or steaming yields sodium carbonate, and also sodium trichloroacetate.

The amount of dyestuff present in the dyestuff solution or in the printing paste is not critical and will depend on the depth of shade which is required on the textile material. The amount of acid-binding agent or substance, which on heating or steaming liberates an acid-binding agent present in the aqueous solution or in the dyestuff solution or in the printing paste is not critical but it is preferred to use between 0.2% and 2% of the acid-binding agent or substance which on heating or steaming liberates an acid-binding agent in the aqueous solution or in the dyestuff solution or between 1% and 3% in the printing paste.

The fastness to washing to subsequent wet processing of the colourations produced by the process of our invention is in general improved by a scouring treatment in for example a hot aqueous solution of soap and sodium carbonate, followed by rinsing in hot water prior to drying.

The new dyestuffs may also be applied to silk, wool, regenerated protein, polyamide and modified polyacrylonitrile textile materials, by the conventional dyeing methods used for these textile materials, that is by dyeing from weakly acid or neutral dyestuff solutions, for example dyestuff solutions containing acetic acid, sodium sulphate or ammonium acetate, at a temperature above 50° C., preferably at a temperature between 50° C. and the boiling point of the dyestuff solution.

The dyestuffs may also be applied to silk, wool and regenerated protein textile materials by the conventional printing methods used for those materials, for example by applying a thickened printing paste containing the dyestuff to the textile material by any of the methods known for applying printing pastes to textile materials and thereafter subjecting the textile material to an elevated temperature for example by steaming the textile material at a temperature betwen 100° C. and 110° C.

The invention is illustrated but not limited by the following examples in which the parts are by weight.

*Example 1*

Diazotised anthranilic acid is coupled with 2-(4'-amino-3'-sulphophenylamino)-5-naphthol-7-sulphonic acid under alkaline conditions and the resulting aminoazo compound is converted into the copper complex by heating with cuprammonium sulphate at 60° C.

A solution of 6.8 parts of the disodium salt of the above copper complex in 100 parts of water is added to a solution of 2.7 parts of tetrachloropyrimidine in 75 parts of dioxan and the mixture is stirred at 90° C. for 5 hours, sodium carbonate solution being added at intervals to keep the solution neutral. The mixture is cooled, 40 parts of sodium chloride are added and the precipitated dyestuff is filtered off, slurried in acetone, refiltered and dried.

When applied to cellulose textile materials in conjunction with an acid-binding agent the dyestuff yields rubine shades possessing very good fastness to light and to washing.

*Example 2*

Diazotised anthranilic acid is coupled with 2-amino-5-naphthol-7-sulphonic acid under alkaline conditions and the resulting aminoazo compound is converted into the 1:2-chromium complex by heating with chromium acetate solution.

A solution of 8.66 parts of the disodium salt of the above 1:2-chromium complex in 250 parts of water is added to a solution of 4.6 parts of tetrachloropyrimidine in 30 parts of acetone and the mixture is stirred at 40° C. for 24 hours, sodium carbonate solution being added at intervals to keep the solution neutral. The solution is cooled, 30 parts of sodium chloride are added and the precipitated dyestuff is filtered off, slurried in acetone, re-filtered and dried.

When applied to cellulose textile materials in conjunction with a treatment with an acid-binding agent the dyestuff yields reddish-brown shades possessing very good fastness to light and to washing.

If in place of 4.6 parts of tetrachloropyrimidine in this example there is used 8.9 parts of tetrabromopyrimidine a similar dyestuff is obtained.

Example 3

Diazotised anthranilic acid is coupled with 2-(p-aminobenzoylamino)-5-naphthol-7-sulphonic acid under alkaline conditions and the resulting aminoazo compound is converted into the 1:2-chromium complex by heating with chromium acetate solution.

A solution of 55.2 parts of the disodium salt of the above 1:2-chromium complex in 300 parts of water at pH 7.0 is added to a solution of 10.9 parts of tetrachloropyrimidine in 60 parts of dioxan. The mixture is stirred at 50° C. for 1 hour and the pH is raised to 7.0 by addition of 2 N sodium carbonate solution. The temperature is maintained at 50° C. and the pH adjusted to 7.0 at intervals until the condensation is complete. The solution is cooled and the product isolated by adding sodium chloride and filtering. The dyestuff is slurred in acetone, refiltered and dried.

When applied to cellulose textile materials in conjunction with an acid binding agent the dyestuff yields bluish-red shades possessing very good fastness to light and washing.

The following table gives further examples of the new dyestuffs of the invention, which are obtained when the 8.66 parts of the disodium salt of the metal complex used in Example 2 are replaced by stoichiometrically equivalent amounts of the metal complexes which are formed by coupling anthranilic acid with the coupling components listed in the second column of the table, and forming a complex with the metal listed in the third column. The shades of the resulting dyestuffs are given in the fourth column.

| Example | Coupling Component | Metal | Shade |
|---|---|---|---|
| 4 | 2-amino-5-naphthol-7-sulphonic sulphonic acid. | Cobalt | Reddish brown. |
| 5 | 2-methylamino-5-naphthol-7-sulphonic acid. | Chromium | Do. |
| 6 | 3-amino-5-napthol-7-sulphonic acid. | do | Do. |
| 7 | do | Cobalt | Do. |
| 8 | 1-amino-5-naphthol-7-sulphonic acid. | Chromium | Violet. |
| 9 | 2-n-butylamino-5-naphthol-7-sulphonic acid. | Copper | Rubine. |

Example 10

Diazotised anthranilic acid is coupled with 2-(4'-amino-3'-sulphophenylamino)-5-naphthol-7-sulphonic acid under alkaline conditions and the resulting aminoazo compound is converted into the 1:2-chromium complex by heating with chromium acetate solution.

A solution of 12.5 parts of the tetrasodium salt of the above 1:2-chromium complex in 150 parts of water is added to a solution of 4.6 parts of tetrachloropyrimidine in 30 parts of dioxan and the mixture is stirred at 90° for 5 hours, sodium carbonate solution being added at intervals to keep the solution neutral. The mixture is cooled, and the dyestuff is precipitated by addition of sodium chloride, filtered off, slurried in acetone, refiltered and dried.

When applied to cellulose textile materials in conjunction with an acid-binding agent, the dyestuff yields rubine shades possessing very good fastness to light and to washing.

Example 11

In place of the 1:2-chromium complex used in Example 10, there are used 12.5 parts of the tetrasodium salt of the 1:2-chromium complex of the dyestuff obtained by diazotisation of anthranilic acid and coupling with 2-(3'-amino-4'-sulphophenylamino)-5-naphthol - 7 - sulphonic acid in alkali. There is obtained a dyestuff which when applied to cellulose textile materials in conjunction with an acid-binding agent yields reddish-brown shades which possess very good fastness to light and washing.

Example 12

In place of the 1:2-chromium complex used in Example 10 there are used 12.8 parts of the tetrasodium salt of the 1:2-chromium complex of the dyestuff obtained by diazotisation of anthranilic acid and coupling with 2-(4'-methyl-amino - 3' - sulphophenylamino) - 5 - naphthol-7-sulphonic acid in alkaline soultion. There is obtained a dyestuff which when applied to cellulose textile materials in conjunction with an acid binding agent yields brown shades which possess very good fastness to light and washing.

What we claim is:

1. The 1:2 chromium complexes of dyestuffs of the formula

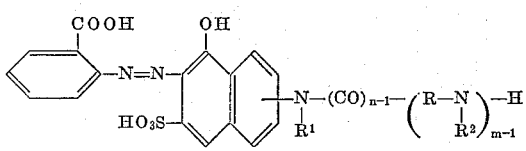

wherein R is a divalent radical selected from the group consisting of m- and p-phenylene radicals and such radicals having substituent sulphonic acid groups; $R^1$ and $R^2$ are selected from the group consisting of hydrogen and lower alkyl radicals; T represents a trihalogenopyrimidyl radical wherein the halogen atoms are selected from the group consisting of chlorine and bromine atoms; and $m$ and $n$ are integers of from 1 to 2 provided that when $m$ is 1, $n$ is 1.

2. The 1:2 chromium complexes of the dyestuffs of the formula

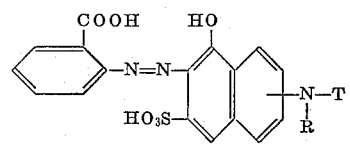

wherein R represents a member selected from the group consisting of hydrogen and lower alkyl; T represents a trihalogenopyrimidyl radical wherein the halogen atoms are selected from the group consisting of chlorine and bromine atoms.

3. The 1:2 chromium complex of the dyestuff of the formula

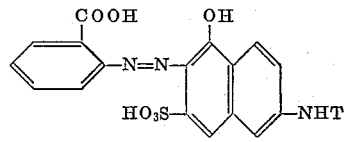

wherein T represents a trichloropyrimidyl radical.

4. The 1:2 chromium complex of the dyestuff of the formula

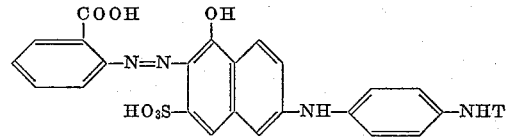

wherein T represents a trichloropyrimidyl radical.

References Cited by the Examiner
FOREIGN PATENTS

| 214,546 | 4/61 | Austria. |
|---|---|---|
| 1,221,621 | 6/60 | France. |
| 1,225,281 | 6/60 | France. |

CHARLES B. PARKER, *Primary Examiner.*

LEON ZITVER, *Examiner.*